United States Patent
Baumann

(10) Patent No.: US 8,788,231 B2
(45) Date of Patent: Jul. 22, 2014

(54) METHOD FOR DETECTING THE ROTATION AND DIRECTION OF ROTATION OF A ROTOR

(75) Inventor: Joachim Baumann, Waldsee (DE)

(73) Assignee: Sensus Spectrum LLC, Raleigh, NC (US)

( * ) Notice: Subject to any disclaimer, the term of this patent is extended or adjusted under 35 U.S.C. 154(b) by 186 days.

(21) Appl. No.: 13/555,503

(22) Filed: Jul. 23, 2012

(65) Prior Publication Data

US 2013/0035889 A1 Feb. 7, 2013

Related U.S. Application Data

(63) Continuation of application No. PCT/EP2010/007838, filed on Dec. 21, 2010.

(30) Foreign Application Priority Data

Jan. 21, 2010 (DE) .......................... 10 2010 005 231

(51) Int. Cl.
*G01C 17/38* (2006.01)
*G06F 11/00* (2006.01)

(52) U.S. Cl.
USPC ................. 702/92; 702/93; 702/94; 702/188; 702/189

(58) Field of Classification Search
USPC ...................... 702/92–94, 104–106, 182–188
See application file for complete search history.

(56) References Cited

U.S. PATENT DOCUMENTS

| | | | |
|---|---|---|---|
| 5,187,989 A | | 2/1993 | Bulteau |
| 7,001,246 B2 * | | 2/2006 | Hanawa et al. .................. 451/8 |
| 7,263,453 B1 * | | 8/2007 | Gansler et al. ................ 702/104 |
| 2008/0142346 A1 | | 6/2008 | Zapf et al. |
| 2010/0156402 A1 * | | 6/2010 | Straubinger et al. ..... 324/207.25 |

FOREIGN PATENT DOCUMENTS

| | | |
|---|---|---|
| DE | 33 40 508 A1 | 11/1985 |
| DE | 36 11 862 A1 | 10/1987 |
| DE | 37 33 943 A1 | 4/1989 |
| DE | 37 33 944 A1 | 4/1989 |
| DE | 39 23 398 C1 | 1/1991 |
| DE | 198 09 031 A1 | 9/1998 |
| DE | 197 25 806 A1 | 1/1999 |
| DE | 100 60 198 A1 | 6/2002 |

(Continued)

OTHER PUBLICATIONS

Translation written opinion of ISA for PCT/EP2010/007838.*

*Primary Examiner* — Phuong Huynh
(74) *Attorney, Agent, or Firm* — Muncy, Geissler, Olds & Lowe, P.C.

(57) ABSTRACT

A method for detecting a rotation and a direction of a rotation of a rotor, on which at least one damping element is positioned, wherein two sensors are arranged. The sensors are damped depending on a position of the damping element. After a standardization has been performed, the measurements are taken by observing consecutive rotational angle positions and then standardization rules are applied to the measured decay times of the sensors. Then a vector, which is entered into a coordinate system, is formed from the values. The present vector angle is determined and compared to the value of a suitable prior vector angle. From the result of the comparison, it is determined whether the rotor has performed a rotation and whether the rotation was forward or backward. By repeating the measurements in the rhythm of the scanning frequency, the rotational motions of the rotor can be detected with high accuracy.

7 Claims, 2 Drawing Sheets

(56) References Cited

FOREIGN PATENT DOCUMENTS

| EP | 0 467 753 A1 | 7/1990 |
| EP | 0 608 494 A2 | 8/1994 |
| EP | 0608494 * | 8/1994 |
| EP | 0 898 152 A1 | 2/1999 |

* cited by examiner

METHOD FOR DETECTING THE ROTATION AND DIRECTION OF ROTATION OF A ROTOR

This application is a continuation of International Application No. PCT/EP2010/007838, which was filed on Dec. 21, 2010, and which claims priority to German Patent Application No. 10 2010 005 231.0, which was filed in Germany on Jan. 21, 2010, and which are both herein incorporated by reference.

BACKGROUND OF THE INVENTION

1. Field of the Invention

The invention relates to a method for detecting a direction of rotation and a direction of rotation of a rotor.

2. Description of the Background Art

Method and devices suitable for carrying out the method for counting the rotations of a rotor, for example, of an indicator or a disk in the measuring mechanism of a consumption meter, are known in numerous variations and are commercially available. Thus, for example, DE 33 40 508 C2 discloses a pulse generator device for water meters with standard pointer-roller counting mechanism. A permanent magnet is mounted on a supporting disk as a pulse transmitter. A pulse receiver arranged outside the counting mechanism housing emits a metering pulse with each passage of the permanent magnet. A comparable arrangement is the subject matter of DE 100 60 198 A1. This type of pulse generator device has not proven useful in practice, however, because it cannot be distinguished whether the counting mechanism is running forwards or backwards. Very large errors occur if the pulse transmitter swings in front of the pulse receiver; then metering pulses are constantly generated although the counting mechanism has not completed a revolution forwards or backwards.

The use of inductive proximity sensors is widespread in practice, which use an LC resonant circuit that can be damped by the proximity of an electrically conducting device and an evaluation circuit for determining the vibration damping triggered by the damping element. The LC resonant circuit is thereby periodically excited to resonant vibrations in the rhythm of a scanning frequency. Subsequently, the time is measured until the amplitude of the resonant vibrations falls below a previously established threshold. If the damping element is located in the sensing range of the sensor, the decay time is short, if the damping element is located outside the sensing range, the decay time is long. If the damping element is located partially in the sensing range of the sensor, the decay time is between these two extremes; the decision on whether the damping element is inside or outside the sensing range is achieved by an additionally introduced switching threshold.

Details on this are shown by the following documents: DE 36 11 862 A1, DE 37 33 943 A1, DE 37 33 944 C2, EP 0 608 494 B1, EP 0 467 753 B1 (which corresponds to U.S. Pat. No. 5,187,989), DE 39 23 398 C1 and DE 19 809 031 A1.

A further property of the known methods and devices is the number of sensors used. Thus, for example, DE 37 33 943 A1 and DE 37 33 944 C2 show methods and devices that use only one sensor. Likewise, DE 36 11 862 A1 shows only one sensor, which is embodied in addition as a transformer.

EP 0 608 494 B1 shows a rotation detector that operates with a measurement sensor, a reference sensor and a rotor with three different damping properties.

EP 0 467 753 B1 shows a device for detecting rotation, which operates with two and more measurement sensors, wherein the sensors are energized consecutively. The inductive crosstalk between the sensors, which can cause disturbances, is thereby to be avoided.

DE 39 23 398 C1 discloses a rotation detector for battery operation, which operates with even four sensors, respectively two of which are connected in a complementary manner to one another. Since the excitation of four LC resonant circuits naturally uses more battery current than the excitation of one or two sensors, this circuit can be operated only with a large battery or only for a short time.

DE 198 09 031 A1 shows that it is possible to produce three coils, which respectively are to be supplemented by a capacitor to an LC resonant circuit, as a printed circuit.

The scanning frequency is not least decisive for the consumption of battery current. The higher the scanning frequency, that is, the more often per time unit the resonant circuits are excited, the higher the battery consumption. To reduce the battery current, the scanning frequency should be as low as possible. However, Shannon's Theorem must not be contravened. Shannon's Theorem says that for the reliable detection of the rotor rotation for each revolution more than two scans must be carried out. This means that the scanning frequency has to be coordinated with the highest speed to be expected, although the maximum speed is rarely or never reached.

To reduce the battery consumption in these cases, it is known from EP 0 898 152 A1 to change the scanning frequency adaptively. When the rotor stops, the scanning frequency is reduced in a stepwise manner, as soon as the rotor rotates again, the maximum scanning frequency is reestablished. However, since the electronic system does not recognize the rotor restarting until it has completed at least a quarter of a rotation, faulty measurements can occur, until the full scanning frequency has been reached again.

If two sensors are used in order to detect the revolutions of a disk that is half covered by a damping element, the two sensors are offset to one another by $\pi/2$. With the aid of the above-mentioned switching threshold it is detected whether the damping element is located in front of the sensor or not. Each sensor thus emits two signals: damped or undamped. Four states can be determined therefrom, according to the four quadrants of the disk. By comparing the consecutive signal modes it can be detected whether the disk has respectively rotated forwards or backwards by $\pi/2$. After counting four consecutive forward movements, a full revolution forwards is detected, after counting four consecutive backward movements, a full revolution backwards is detected.

The important disadvantage of these circuit arrangements is the uncertainty of the decision "damped" or "undamped," if only the edge of the damping element is located in the region of the sensor sensing range. In addition, there is the general inaccuracy in the detection of the instantaneous decay time, caused by the inaccuracy in the measurement of the oscillation amplitudes and the decision on whether the current amplitude is above or below the amplitude threshold. Further error sources are noise, e.g., the quantization noise, and the changes of the sensors due to aging. All of this means that the scanning frequency in practice has to be set much higher than required by Shannon's Scanning Theorem. This is associated with correspondingly increased battery consumption. This is disadvantageous.

SUMMARY OF THE INVENTION

It is therefore an object of the present invention to provide a method for the more precise detection of the direction of rotation and the rotation of rotors with simultaneously reduced energy consumption.

The method according to an embodiment of the invention omits the previously customary decision "damped" or "undamped." Instead, the measured decay times are directly processed. However, in order to avoid inaccuracies due to sensors with properties deviating from one another, due to different aging processes etc., the sensors or the decay times thereof are first standardized in that the value +1 is assigned to the maximum undamped decay time, the value −1 is assigned to the minimum damped decay time, so that the actual decay times measured in operation, to which the same standardization rules are applied, are in the range between +1 and −1, depending on how far the damping element is located in the sensing range of the sensors. From the measured and standardized decay times of the sensors a vector is formed in a two-dimensional coordinate system, the axes of which are at the same angle to one another as the axes of the sensors. If, as is mostly the case, the rotation of disk, half of which is covered by a damping plate, is to be detected with the aid of two sensors that are arranged at right angles to one another, the vector is entered into a two-dimensional right-angle coordinate system, starting from the zero point thereof. In this coordinate system the vector rotates from measurement to measurement at the same speed and in the same direction as the monitored rotor. Thus the current angular position of the monitored rotor is known at any scanning instant, not only, as in the past, the more or less precise completion of a rotation by $\pi/2$.

Due to the fact that the respective angular position of the monitored rotor is precisely known, by comparing the consecutive angular positions it can be determined with much more accuracy whether the rotor is turning, in which direction it is turning and when a complete revolution forwards or backwards has been completed. Thanks to this increased resolution of each individual measurement, the scanning frequency and thus energy consumption can be greatly reduced.

Another advantage is the standardization of the maximum and minimum decay times, due to which the individual deviations of the sensors are eliminated. This applies in particular when, according to an advantageous further development of the invention, the standardization steps are repeated at time intervals.

Due to the periodicity of the trigonometric equations, jumps in value occur when the vector angle exceeds the 360° threshold or falls below the 0° threshold. Since the direction of rotation of the rotor between the two measurements at first is unknown, for example, a negative difference of the measured angle can be caused by a backward rotation or by a jump over the 360° threshold with a forward rotation. However, it is desirable that it can be reliably determined when a full revolution of the rotor forwards or backwards has been completed. In order to achieve this, the actual angular difference is determined with the aid of the equations referenced in claim 2. With the first of these equations it is verified that a jump over the zero line has not occurred, with the second that a jump over the zero line in the forward direction has occurred and with the third that a jump over the zero line in the backward direction has occurred. The smallest of the three calculated values B1, B2 or B3 corresponds to the shortest possible angular arc that the rotor can have covered between the previous and the current measurement.

In order to also determine the direction of rotation for the arc length, calculated with the equations B1, B2 and B3, of the angle of rotation covered since the last scan, with the aid of the equations C1, C2 and C3 from claim 2 the sign and thus the direction of rotation are determined. A plus sign means a rotation forwards, a minus sign means a rotation backwards.

According to a further embodiment of the invention, the scanning frequency can be reduced when the amount of the angular difference falls below a first threshold and increased again when the amount of the angular difference exceeds a second threshold.

Preferably, the invention can be used when two sensors are used at an angular spacing of $\pi/2$ and a disk half covered by a damping element as a rotor.

In this case, the current angle of the vector formed from the measured and standardized decay times can be calculated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
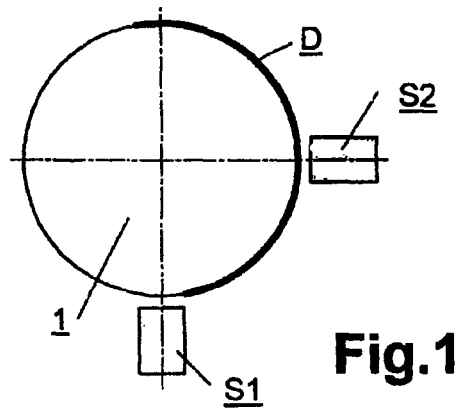
FIG. 1 illustrates diagrammatically an arrangement for detecting the rotation of a two-dimensional rotor, FIG. 2 a simplified representation of the decay process of an undamped sensor, FIG. 3 a simplified representation of the decay process of the sensor with maximum damping, FIG. 4 the evaluation of the rotation of the two-dimensional rotor shown in FIG. 1 in a two-dimensional planar coordinate system standardized to values between +1 and −1, FIG. 5 position and sequence of the measuring times with a rotor rotating at lower speed and FIG. 6 position and sequence of the measuring times with a rotor rotating at higher speed.

FIG. 1 shows purely diagrammatically a rotor 1 in the form of a disk that is half covered by a damping element D. Two sensors S1, S2 are arranged at a small distance from the rotor 1 and with reciprocal angular distance of $\pi/2$. The sensors S1, S2 are formed by LC resonant circuits that are excited to vibrations in the rhythm of a scanning frequency fA (see FIGS. 5 and 6). The decay times depend on whether the damping element D is located completely, partially or not at all in the sensing range of the sensors S1, S2.

Figure 2:
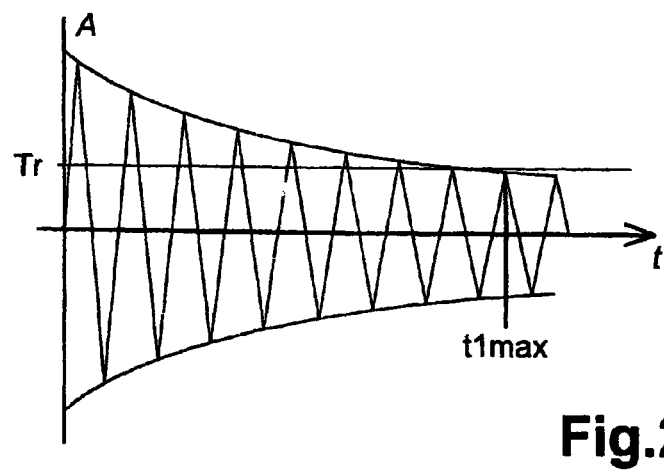

FIG. 2 shows a simplified representation of the decay time of the sensor S1 in the state with maximum damping. The corresponding decay time with maximum undamping t1max is the length of time until the amplitude A of the vibrations falls below a predetermined switching threshold Tr.

Figure 3:
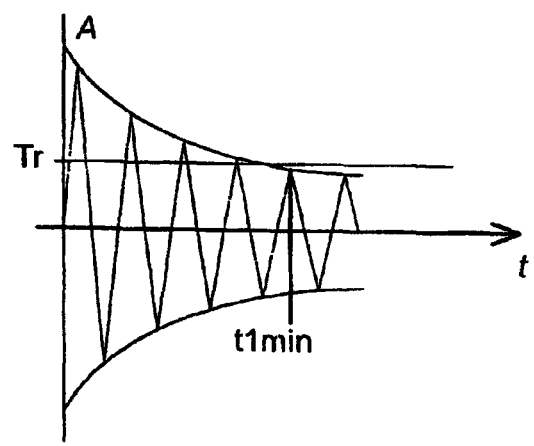

FIG. 3 shows analogously the processes with the sensor S1 with maximum damping. The switching threshold Tr is the same as in FIG. 2. The minimum decay time t1min is much shorter than t1max.

Figure 4:
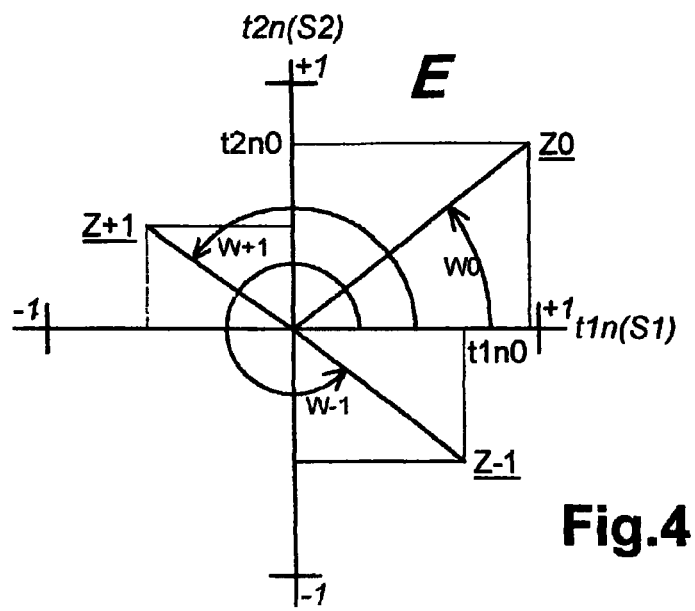

FIG. 4 shows a two-dimensional right angle coordinate system E matching the exemplary embodiment of FIG. 1. The value ranges of the two axes are standardized to values between +1 and −1. The value +1 on the axis t1n (S1) thereby corresponds to the value t1max in FIG. 2, the value −1 corresponds to the value t1min in FIG. 3.

The same applies analogously to the values of the second sensor S2 on the second axis labeled t2n (S2).

The values actually measured in sensors S1 and S2 are between t1max and t1min. Thanks to the application of the same standardization rules, they are between +1 and −1 in the image in FIG. 4. From consecutive measured and standardized values t1n, t2n, vectors Z are formed and entered in the coordinate system E.

Three vectors Z=1, Z0 and Z+1 are entered in FIG. 4. The vector Z0 is formed by vector addition of the measured and standardized value t1n0 of the sensor S1 and the measured and standardized component t2n0 of the sensor S2. The current vector angle W0 can be calculated by the equation W0=arctan (t2n0/t1n0). In general, the vector angle W is determined by means of the formulas:

| | | | |
|---|---|---|---|
| a. | $B1 = |(W0) - (W-1)|$ | | $C1 = \text{signum}((W0) - (W-1))$ |
| b. | $B2 = |(W0) - (W-1) + 2\pi|$ | | $C2 = \text{signum}((W0) - (W-1) + 2\pi)$ |
| c. | $B3 = |(W0) - (W-1) - 2\pi|$ | | $C3 = \text{signum}((W0) - (W-1) - 2\pi)$. |

The vector angle W+1 of the next following vector Z+1 is calculated accordingly, the vector angle W−1 of the preceding vector Z−1 is also calculated in the same way.

As shown by FIG. 4, the vector angle W0 of the current vector Z0 is smaller than the vector angle W−1 of the preceding vector Z−1. However, a rotation in the backward direction has not taken place, but a rotation in the forward direction over the zero line. In order to be able to detect the actual direction of rotation and thus the crossing of the zero line or the completion of a full revolution, the amount of the minimum angular difference ΔW between Z−1 and Z0 is determined using the following equation:

$$|\Delta W| = \min\{|(W0)-(W-1)|, |(W0)-(W-1)+2\pi|, |(W0)-(W-1)-2\pi|\} \quad a.$$

Naturally, with a backward rotation of the rotor 1 when crossing over the zero line, the current vector angle will be much larger than the preceding vector angle. Here too clarification is obtained by the selection of the minimum value of |ΔW|.

Figure 5:
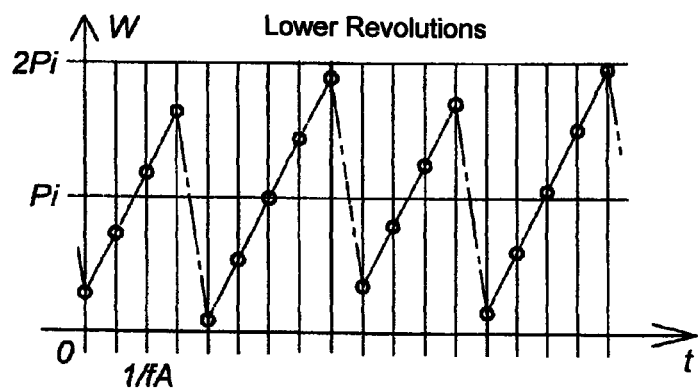
Figure 6:
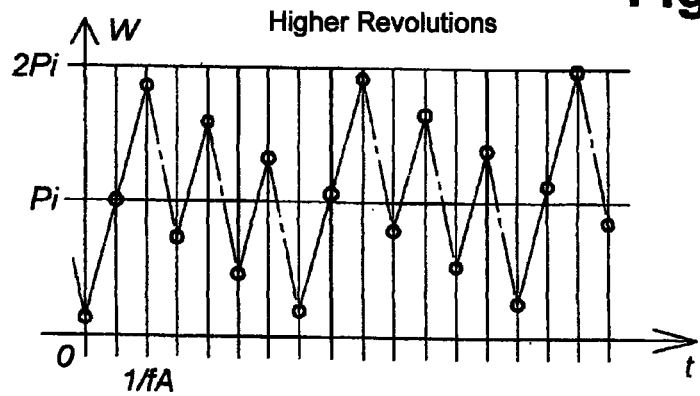

FIGS. 5 and 6 show the position and number of the scanning times in the rhythm of the scanning frequency fA at lower speed (FIG. 5) and at high speed (FIG. 6) for the forward direction of rotation.

With the rotor shown in FIG. 5 at lower speed more scanning times result per revolution, with the rotor shown in FIG. 6 at higher speed fewer scanning times result per revolution. Furthermore, it is discernible that the vector angles W move only between 0° and 360° or between 0 and 2π. However, the multivaluedness of the measured values caused thereby, as shown above, can be eliminated by the additional criteria, namely the calculation of the minimum angular difference and of the associated signum value.

In any case, the current angular position of the rotor 1 and thus the rotation thereof forwards or backwards can be detected with a high degree of certainty. The processing of the angles determined with increased resolution makes it possible even with few measuring points per revolution, that is, with reduced scanning frequency, for the rotations and the directions of rotation of the rotor 1 to be detected with a high degree of certainty. With the method according to the invention the scanning frequency can be almost halved compared to conventional methods with at least the same reliability of the detection of rotation and direction of rotation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a rotation and a direction of the rotation of a rotor, the method comprising:
   arranging at least one damping element on the rotor;
   arranging two sensors, formed by a resonant circuit, offset to one another and at a distance from the rotor and the damping element;
   generating a scanning frequency;
   periodic short excitations of the sensors to vibrations in a rhythm of the scanning frequency;
   detecting decay times of the sensors;
   converting the decay times into rotation angle positions of the rotor;
   comparing consecutive rotation angle positions to determine the direction of rotation;
   observing consecutive rotation angle positions to recognize a full revolution;
   implementing a standardization, the implementation comprising:
      determining a maximum decay time of an undamped first sensor;
      determining a minimum decay time of a damped first sensor;
      standardizing the maximum decay time of the undamped first sensor to a value +1;
      standardizing the minimum decay time of the damped first sensor to a value −1; and
      repeating the standardization steps for a further sensor; and
   implementing measurements, the implementation comprising:
      measuring current decay times of the sensors in the rhythm of the scanning frequency;
      applying the standardization rules to the measured decay times of the sensors;
      forming a vector from the standardized values of the measured decay times and, starting from a zero point thereof, entering the vector into a coordinate system, dimensions of which correspond to a number of sensors used;
      determining a current vector angle;
      comparing the current vector angle to a value of a suitable preceding vector angle;
      determining the rotation of the rotor;
      determining the direction of rotation; and
      repeating the measurements in the rhythm of the scanning frequency.

2. The method according to claim 1, wherein:
   to determine the rotation angle difference between the current vector angle and the preceding vector angle, the following equations are calculated:

| | |
|---|---|
| $B1 = |(W0) - (W-1)|$ | $C1 = \text{signum}((W0) - (W-1))$ |
| $B2 = |(W0) - (W-1) + 2\pi|$ | $C2 = \text{signum}((W0) - (W-1) + 2\pi)$ |
| $B3 = |(W0) - (W-1) - 2\pi|$ | $C3 = \text{signum}((W0) - (W-1) - 2\pi)$; | wherein an amount of an actual rotation angle difference between the current and the preceding measurement results from an equation of the three equations B1, B2, and B3, which has a minimum value;

wherein the direction of rotation of the vector or of the rotor between a current and a preceding measurement results from a signum of the equation C1, C2 or C3 which belongs to the equation B1, B2, B3 with the minimum value; and wherein a plus sign stands for forwards and a minus sign stands for backwards.

3. The method according to claim 2, wherein an actual angular difference results from a product of the equation B1, B2 or B3 with the minimum value and the associated signum C1, C2 or C3.

4. The method according to claim 1, wherein the repetition of the standardization is performed at time intervals.

5. The method according to claim 1, wherein a scanning frequency is reduced when a difference angle falls below a first threshold, and wherein the scanning frequency is increased when the difference angle exceeds a second threshold.

6. The method according to claim 1, wherein the determination of the vector angle is done by the formulas:

$W = \arctan(t2n/t1n)$ when $t1n => 0$ and $t2n => 0$, $W = \arctan(t2n/t1n) + \pi$ when $t1n < 0$, $W = \arctan(t2n/t1n) + 2\pi$ when $t1n => 0$ and $t2n < 0$.

7. The method according to claim 1, wherein a disk is the rotor.

* * * * *